United States Patent [19]

Antezana

[11] Patent Number: 4,679,475
[45] Date of Patent: Jul. 14, 1987

[54] LOG-BUNDLING AND CUTOFF APPARATUS

[75] Inventor: Luis F. Antezana, Mercer Island, Wash.

[73] Assignee: Nicholson Manufacturing Corporation, Seattle, Wash.

[21] Appl. No.: 924,103

[22] Filed: Oct. 31, 1986

Related U.S. Application Data

[63] Continuation of Ser. No. 705,954, Feb. 27, 1985, abandoned.

[51] Int. Cl.[4] ............................ B27B 1/00; B27B 5/02
[52] U.S. Cl. ...................................... 83/420; 83/435.2; 83/471.2; 83/477.1; 83/485; 83/449; 83/639; 83/98
[58] Field of Search ................... 83/167, 471.2, 477.1, 83/98, 485, 487, 409, 417, 420, 428, 433, 435.2, 449, 639, 613, 928; 414/45, 48, 49

[56] References Cited

U.S. PATENT DOCUMENTS

| | | | |
|---|---|---|---|
| 3,379,227 | 4/1968 | Mason | 83/471.2 |
| 3,548,892 | 12/1970 | Gentry | 83/471.2 |
| 3,580,306 | 5/1971 | Tanguay | 83/471.2 |

Primary Examiner—Donald R. Schran
Attorney, Agent, or Firm—Robert W. Beach; Ward Brown

[57] ABSTRACT

A trough conveyor receives small logs from a deck to form a bundle and conveys the bundled logs lengthwise to a discharge end. The log bundle is transported intermittently to project sections of the log bundle successively beyond the discharge end of the trough conveyor, which sections are cut off to form batches of bolts by vertically reciprocable twin saw cutoff mechanism. After a cutting operation, the saws may be swung away from each other to clear the trough conveyor while the saws are being raised and, during such raising movement, the trough conveyor may be powered to feed the log bundle lengthwise to project the next bolt-making increment of the logs beyond the cutoff mechanism.

8 Claims, 7 Drawing Figures

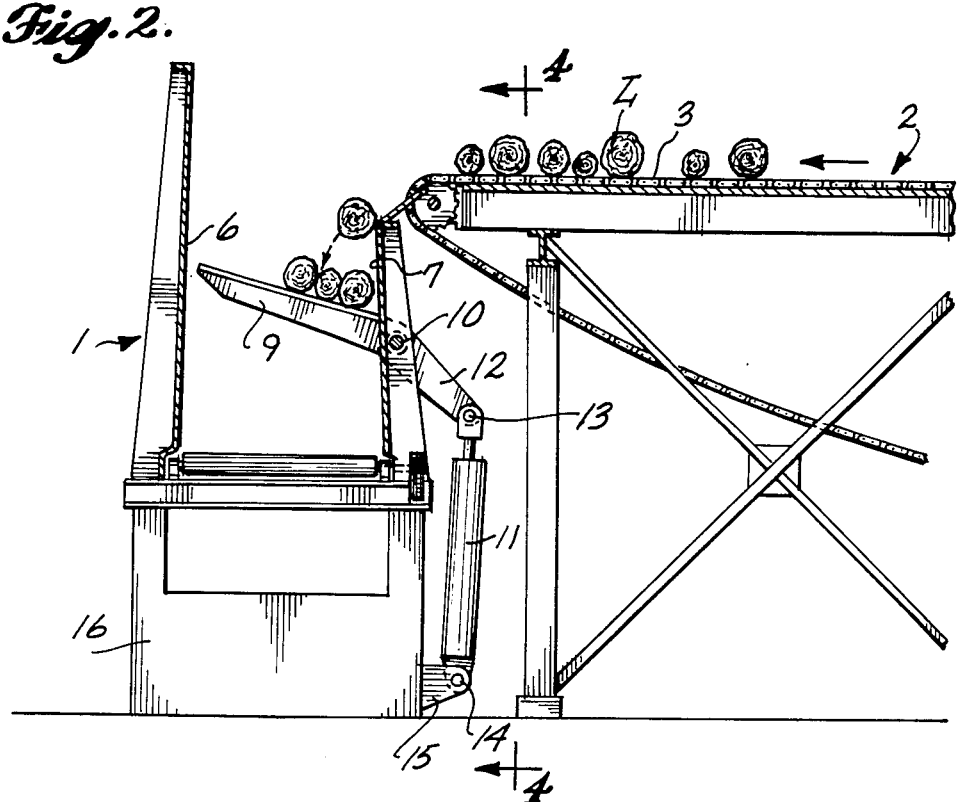
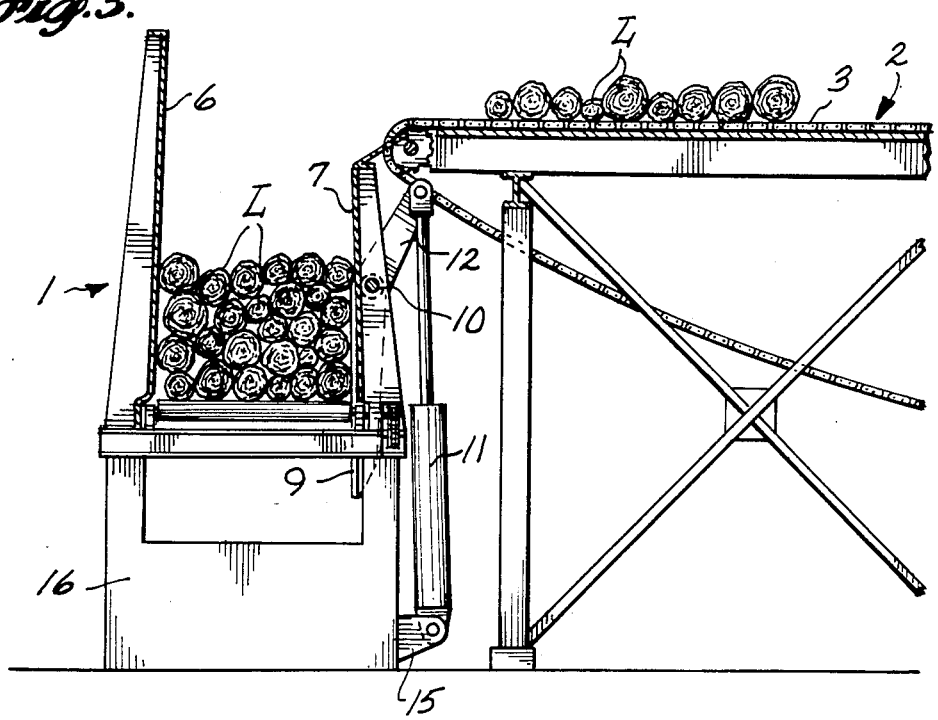

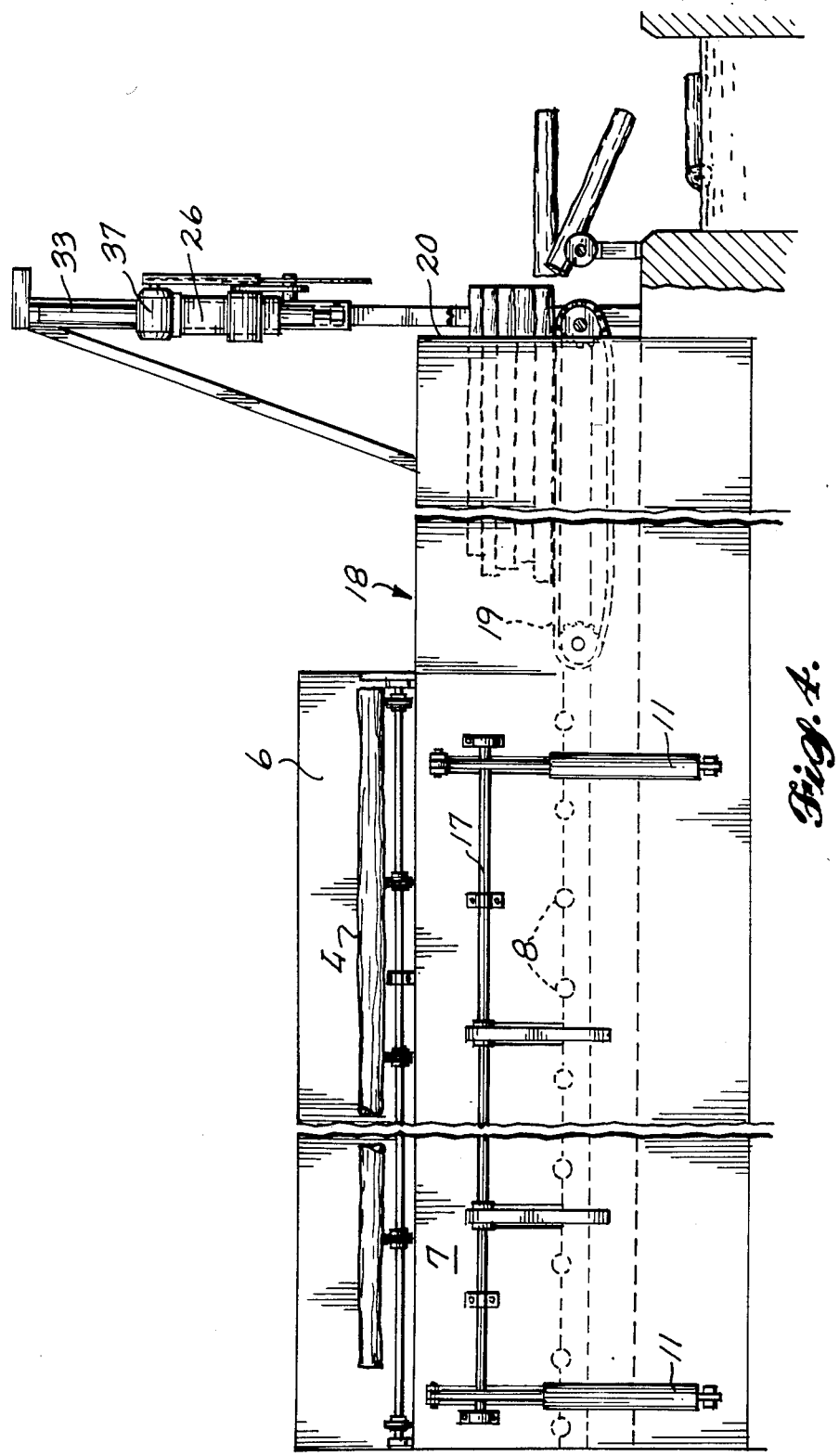

LOG-BUNDLING AND CUTOFF APPARATUS

This a continuation of co-pending application Ser. No. 705,954 filed on Feb. 27, 1985, now abandoned.

BACKGROUND OF THE INVENTION

1. Field of the Invention

This invention relates to sawing cutoff apparatus for cutting into bolts a plurality of logs held in a bundle by a trough conveyor.

2. Prior Art

Cutoff saw mechanism of the general type used in the present invention is shown in Mason U.S. Pat. No. 3,379,227, issued Apr. 23, 1968. The saw apparatus of that invention is used for crosscutting a single log or like elongated workpiece in a sawmill to crosscut logs to selected lengths.

SUMMARY OF THE INVENTION

A principal object of the invention is to cut into bolts a plurality of logs held in a bundle by a deep trough conveyor.

A particular object is to provide such cutoff apparatus which is of large capacity and which can be operated quickly to provide high production.

Another object is to provide such log bundle cutoff apparatus which can be operated with a minimum number of operators.

It is also an object to provide such log bundle cutoff apparatus which is of rugged construction so that its various components will not be likely to break despite the rough usage to which they may be subjected by operation of the apparatus.

The foregoing objects can be accomplished by providing a deep trough conveyor into which logs are deposited from a deck adjacent to the conveyor. Log-supporting and lowering mechanism may receive logs from the deck at an elevation to minimize their fall and will lower the logs gently onto conveying means in the bottom of the trough conveyor. The trough conveyor then holds the logs in a bundle and transports them in bundled condition to a cutoff rig having twin substantially coplanar circular cutoff saws for cutting successive batches of bolts from the logs of the bundle.

BRIEF DESCRIPTION OF THE DRAWINGS

FIG. 2 is an end elevation of apparatus as seen from the feed end, and FIG. 3 is a similar view showing parts in different positions.

FIG. 4 is a vertical section of the apparatus taken on line 4—4 of FIG. 2.

DETAILED DESCRIPTION

The purpose of the apparatus of the present invention is to assemble a plurality of small logs into bundles and, while the logs are held in bundled condition, to cut from such logs batches of bolts which can be barked in a drum barker and chipped much more easily and quickly than long logs to make pulp chips or hog fuel.

Figure 1:
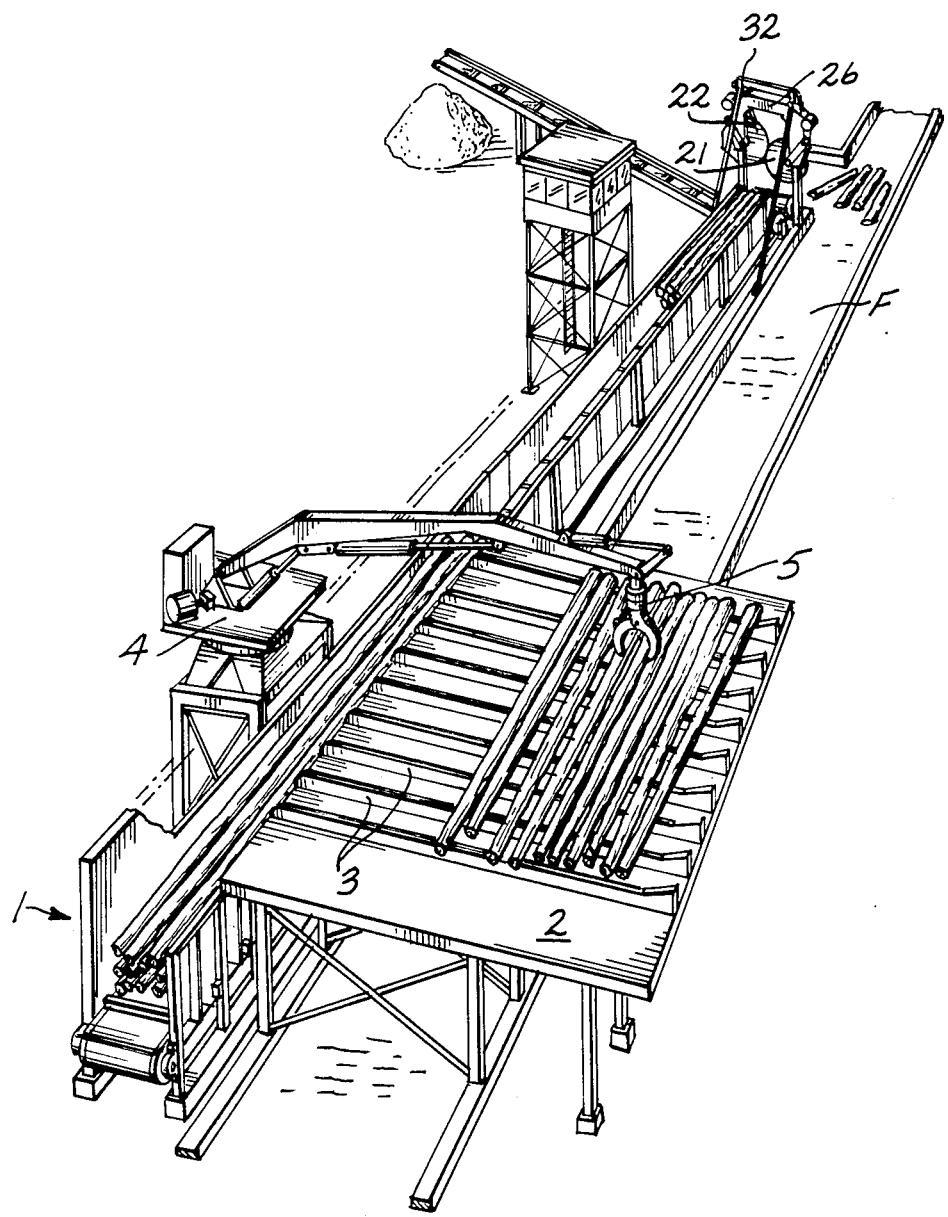
FIG. 1 is a top perspective of log-bundling and cutoff apparatus in accordance with the present invention.

The apparatus includes an elongated deep log-bundling trough conveyor 1 shown best in FIG. 1 having a length preferably at least twice as great as the length of logs L to be cut, the depth and width of which may be generally equal, such as approximately six feet. Logs, which may range from 2 inches (5.08 cm) in diameter to 20 inches (50.80 cm) in diameter, are deposited in the feed end portion of the trough conveyor from a loading deck 2 adjacent to such trough conveyor feed end. More logs can be accommodated on such deck than required to form a bundle of logs, enabling enough logs to be accumulated to be dumped quickly into the trough conveyor to make a bundle of a height equal to a major portion of the depth of the trough conveyor.

Such deck has parallel chains 3 extending transversely of the length of the trough for moving logs from the deck into the trough. Logs can be deposited onto the deck 2 by any suitable mechanism such as a log-loading crane 4 having a grapple 5 on the end of its boom that may be large enough to grab several logs at once. Such crane can pick up logs from piles in a storage yard and swing them onto the portion of deck 2 remote from the trough conveyor in generally parallel relationship with their lengths substantially in registration. The chains 3 cooperate to transport logs transversely of their lengths across the deck 2 to dump them successively into the trough conveyor 1. Alternatively, the log-loading crane can be located to deposit logs directly into the trough conveyor, but such loading procedure would take longer than loading a bundle of logs from the deck 2 into the trough conveyor.

As shown in FIG. 2, the trough conveyor 1 includes opposite upright sides 6 and 7 that have sufficient vertical widths, such as six feet, at least substantially as great as the conveyor width, to form a deep log-bundling trough conveyor. Such conveyor can accommodate a log bundle composed of several superposed layers. The conveying means in the bottom of the trough conveyor 1 preferably is of the live-roller type including rollers 8, as shown in FIGS. 2 and 4. Alternatively, the conveying means may be rows of parallel chains or chains carrying flights that support and transport the logs.

Because of the considerable depth of such conveyor, it is possible that dumping logs from the deck 2 onto the conveying means in the bottom of the trough conveyor might injure such conveying means, particularly if the conveying means were subjected to repeated impacts of logs dropped from the deck. Consequently, it is desirable to provide log-supporting means in the trough conveyor located above the conveying means in the bottom of the trough conveyor to support logs above such conveying means initially and to lower them comparatively gently onto the conveying means.

The log-supporting and lowering mechanism shown in FIGS. 2 and 3 includes arms 9 extending transversely of the trough conveyor, as shown in FIG. 2, when in their upper log-receiving position. Such arms are swingably supported by a pivot or shaft 10 mounted on the side 7 of the trough conveyor, as shown in FIGS. 2 and 3. The arms can be swung between the generally horizontal position shown in FIG. 2 and the lowered upright position shown in FIG. 3 by fluid-operated, preferably pneumatic, jacks 11 connected to an actuating projection 12 of the arm 9 projecting outwardly from the pivot 10 by the pivot 13. The end of the jack 11 remote from the actuating projection 12 of the arm is connected by a pivot 14 to a bracket 15 mounted on the side of the trough conveyor base 16.

The log-supporting means includes several supporting arms 9 spaced lengthwise of the trough conveyor 1, as shown in FIG. 4. Each of such arms is located between adjacent rollers 8 of the live-roller conveyor so that it can swing from the upper log-supporting position shown in FIG. 2 downward to the depending upright position shown in FIG. 3 about its pivot 10. Swinging of the several arms 9 can be coordinated by making the arm pivots 10 in the form of a shaft 17 rigidly connecting the arms for conjoint swinging. In such case, only one or perhaps two fluid jack actuators 11 are provided so that the swinging of one arm will effect swinging of all the arms conjointly.

Figure 5:
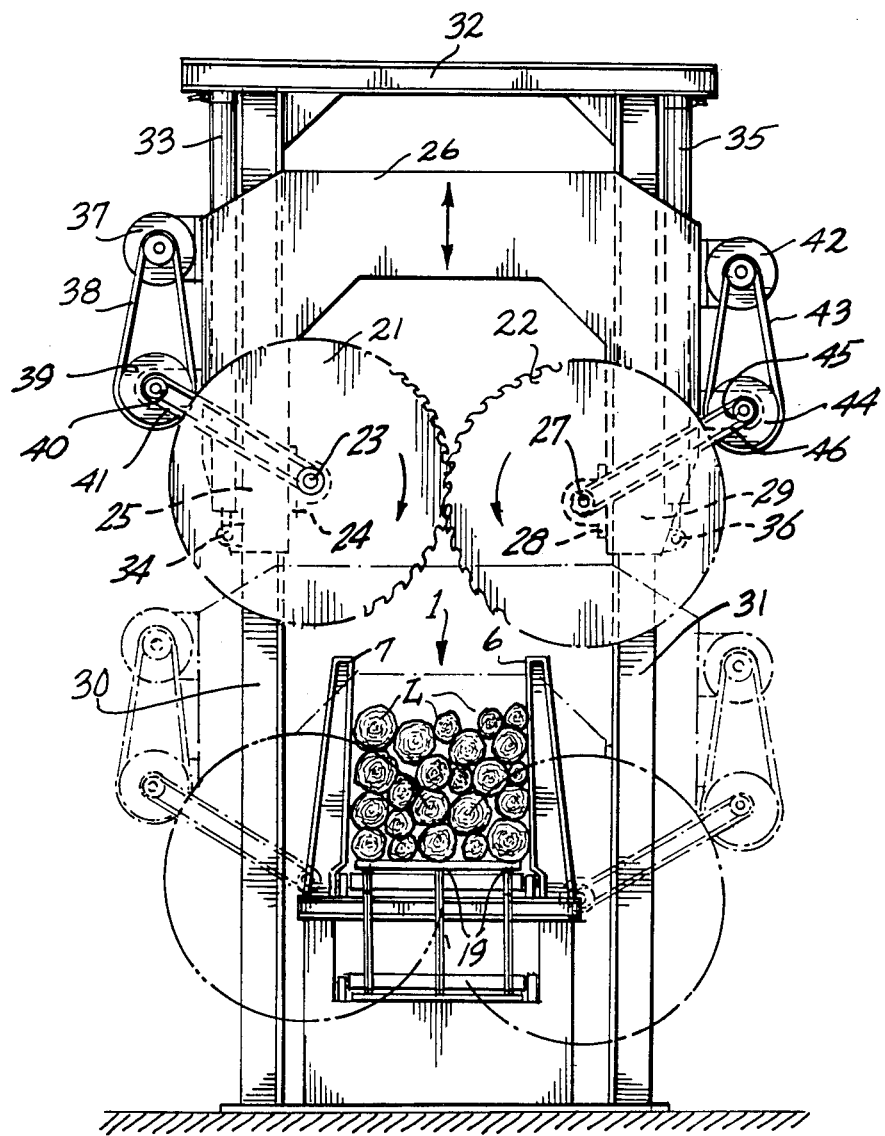
FIG. 5 is an end elevation of the discharge end of the apparatus.

With the arms 9 in the raised position shown in FIG. 2, the deck chains 3 can be driven to transport the logs L to and over the edge of the deck adjacent to the trough conveyor 1 so that they will drop down onto the raised arms. As the bunch of logs on the arms 9 increases, the pneumatic jack actuator 11 can be extended to swing the arms 9 downward. The logs on the arms will then first roll or slide to the tips of the arms and lodge against the trough conveyor side 6. As the arms are swung farther, the logs are laid onto the rolls 8 of the roll conveyor first adjacent to the trough side 6 and then continuing toward the trough side 7 until the desired size of log bundle has been accumulated in the trough conveyor and confined by its sides, as shown in FIG. 3 and FIG. 5. The height of such log bundle should be equal to a major portion of the trough conveyor depth.

It is preferred that the inner surfaces of the trough conveyor sides 6 and 7 converge upward so as to prevent any vertical component of the weight of the logs being transmitted to the trough conveyor sides. Such upward convergence of the trough conveyor sides will tend to reduce friction of the logs with the trough sides.

As shown in FIG. 1 and FIG. 4, it is preferred that the extent of deck 2 lengthwise of the trough conveyor be at least approximately as great as the length of the logs to be deposited in the trough conveyor, which may be as much as sixty feet (18.28 meters). The trough conveyor then includes a section 18 shown in FIG. 4 which may have a chain or belt type of conveying means 19 in its bottom for transporting the logs through such section to the discharge end 20 of the trough conveyor. The section 18 of the trough conveyor between the deck 2 and the discharge end of the conveyor should also be of a length such that one bundle of logs can be transported through the section 18 of the trough conveyor and moved out of its discharge end while the next bundle of logs is being accumulated in the section of the trough conveyor alongside the deck 2 without interference with the previously accumulated bundle of logs being moved through the conveyor section 18. Such section should be at least approximately one-fourth as long as the logs.

A cutoff sawing rig is located adjacent to the discharge end 20 of the trough conveyor including two cooperating twin circular cutoff saws 21 and 22. The saw 21 is carried by an arbor 23 journaled in a bearing 24 mounted on the inner side of a leg 25 depending downwardly from the crosshead 26 of the cutoff saw carriage. The saw 22 is carried by an arbor 27 mounted in a bearing 28 carried by the inner side of a second leg 29 depending from the crosshead 26 of the cutoff saw carriage.

Figure 6:
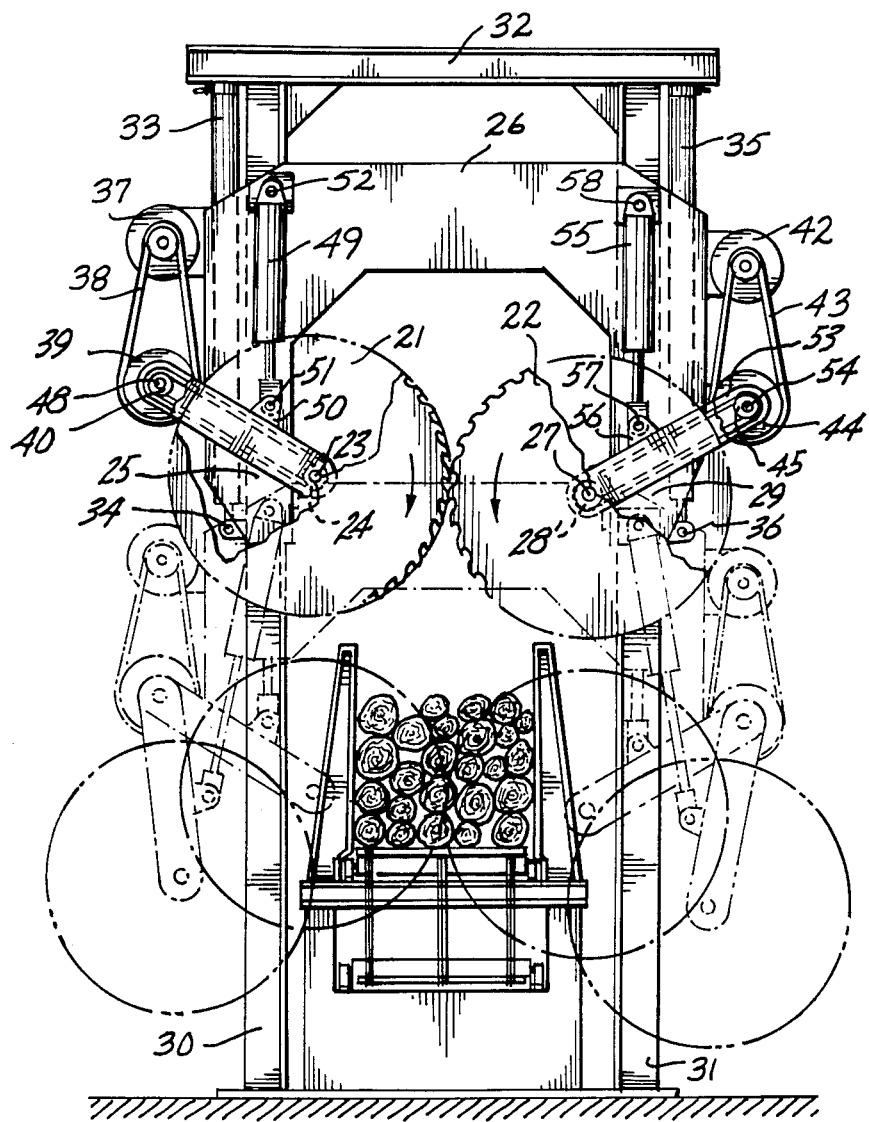
FIG. 6 is an end elevation of the discharge end of the apparatus with parts broken way showing a modified type of cutoff mechanism.

The legs 25 and 29 are substantially parallel and are disposed alongside with the columns 30 and 31, respectively, of a carriage-mounting frame. The upper ends of such columns are connected by a crossbeam 32 to form a guide frame for the vertically reciprocable saw carriage. The columns 30 and 31 are spaced apart by the crossbeam 32 so that they are located on opposite sides of trough conveyor 1 and the carriage arms 25 and 29 are spaced apart by the crosshead 26 a distance such that the adjacent portions of the peripheries of the saws 21 and 22 will overlap slightly substantially centerally over the trough conveyor, as shown in FIGS. 5 and 6. The saw arbors 23 and 27 are spaced apart farther than the width of the trough conveyor 1. Consequently, the inner lower quarter sectors of the saws cooperate to span the width of the trough conveyor so that they can cooperatively effect a continuous cut through the bundle of logs L. As shown in FIG. 5, such saws can be offset elevationally to a sufficient extent, the left saw as seen in FIG. 5, being higher than the right saw, so that the adjacent portions of the peripheries of the saws can be disposed in overlapping relationship while the saws themselves are coplanar.

The cutoff saw carriage can be reciprocated relative to the carriage-guiding frame by a fluid pressure jack 33 located alongside the column 30 and reacting from the crossbeam 32 to a pivot 34 connecting such jack to the carriage leg 25. Similarly, a fluid pressure jack 35 is located alongside upright carriage leg 29 and reacts between the frame crossbeam 32 and a pivot 36 connecting the lower end of such jack to the carriage leg 29. By extending jacks 33 and 35 simultaneously, the carriage can be moved downward from the solid line position shown in FIG. 5 where the saws 21 and 22 are above the trough conveyor 1 to the lowered position shown in broken lines where the overlapping portions of the saw peripheries are located below the trough conveyor.

The drive mechanism for rotating saw 21 is mounted on the carriage leg 25 and includes an electric motor 37 driving a belt 38 to turn a comparatively large pulley 39. This pulley turns a smaller concentric pulley 40 to drive belt 41 connected to a sprocket concentric with the saw arbor 23. The belt 38, pulleys 39 and 40 and belt 41 constitute a speed reduction drive between the electric motor 37 and the saw 21 so that such saw is rotated clockwise as seen in FIG. 5 at a speed perhaps one-fourth as great as the speed of the motor. Saw 22 is driven in a similar manner by an electric motor 42 mounted on the carriage leg 29 and connected by a belt 43 to a comparatively large pulley 44 that, in turn, drives a smaller concentric pulley 45. This pulley drives a belt 46 which, in turn, drives a pulley connected to saw 22 which is concentric with the saw arbor 27. Again, belt 43, pulleys 44 and 45 and belt 46 constitute speed reduction mechanism so that the saw 22 will be rotated counterclockwise as seen in FIG. 5 much slower than motor 42, such as approximately one-fourth as fast.

After a bundle of logs has been accumulated in the trough conveyor 1 alongside the deck 2, as shown in FIG. 3, the rollers 8 are powered to move the log bundle through the trough conveyor into the conveyor section 18. Chains 3 on deck 2 may then immediately be powered to move the logs from the deck 2 with the arms 9 in raised position for accumulating the next bundle of logs in the trough conveyor. The conveying chains 19 are powered to move the log bundle in trough conveyor section 18 intermittently for projecting portions of the log bundle in cantilever fashion beyond the discharge end 20 of the conveyor to be cut off. When a desired length of the log bundle projects past the cutoff saws 21 and 22, such as four feet (1.2 meters) to twenty feet (6.0 meters), the conveyor 18 is stopped and the saw carriage is moved downward from the solid line position shown in FIG. 5 to the broken line for cutting a batch of bolts off the ends of the logs in the bundle and the carriage is raised again.

As apparent from FIG. 5, when the saws are lowered the lower peripheries first contact the outer edges of the log bundle to sever bolts from the upper outer components of the log bundle. Because the saws 21 and 22 are rotating in opposite directions as shown in FIG. 5, their lower peripheries are moving away from each other so that any friction with severed bolt ends will push the severed bolts laterally outward to fall free.

As the bolts are cut first from the laterally outer portions of the log bundle and then progressively inward and downward, the severed bolts fall laterally off the side to afford room for the next laterally inner bolts to be free. If bolts were cut from the central logs first they would be confined by the laterally outward uncut logs instead of falling away and would increase the friction on the saws.

After each batch of bolts has been severed from the log bundle ends, the chain conveyor 19 can be activated to move the log bundle through the trough conveyor another increment beyond the twin cutoff saws so that the such saws can be lowered again to cut the next batch of bolts from the log bundle. This procedure is continued until the entire bundle of logs has been cut into bolts.

Bolts cut from the projecting ends of logs in a bundle, as indicated in FIG. 4, drop into a flume F by which they can be transported to chipping mechanism or to a storage area for later chipping. The operation should be timed so that the rollers 8 in the section of the trough conveyor alongside deck 2 will move a bundle of logs accumulated in the trough conveyor fully into a position in conveyor section 18 by the time almost the entire next previous log bundle has been cut into bolts.

The accumulation of a log bundle in trough conveyor 1 alongside deck 2 may be accomplished more quickly than a log bundle can be cut into bolts by the cutoff rig shown in FIG. 5 because of the time required both to lower the saw carriage and to raise the saw carriage between each feeding operation of conveyor 19. The cutoff operation can be expedited by utilizing the modified twin circular saw cutoff rig shown in FIG. 6. In this instance, the bearing 24' for the arbor 23 of saw 21 is mounted on an arm 47 having one end carried by and swingable relative to the pivot mounting 48 which also mounts pulleys 39 and 40. This arm can be swung between the upper solid line position shown in FIG. 6 and the lower downwardly and outwardly swung position shown in broken lines in that figure by a fluid pressure jack 49 connected to a bracket 50 on the arm 47 by a pivot 51. The opposite end of the jack is connected by a pivot 52 to the crosshead 26 of the saw carriage.

Similarly, the bearing 28' for saw 22 is mounted on the swinging end of arm 53 which is mounted on the pivot 54 for pulleys 44 and 45. Arm 53 can be swung between the upper position shown in solid lines in FIG. 6 and the lower downwardly and outwardly swung position shown in broken lines in that figure by extension of a fluid pressure jack 55. The lower end of this jack is connected to a bracket 56 mounted on arm 53 by a pivot 57. The upper end of the jack is connected by a pivot 58 to the crosshead 26 of the carriage.

With the modified mechanism shown in FIG. 6, the jacks 49 and 55 may be retracted to hold the circular saws 21 and 22 in positions with the adjacent portions of their peripheries overlapping so that, when the carriage is moved downward by jacks 33 and 35, the saws will cut a batch of bolts from the log bundle. When the saws have been moved downward sufficiently far to complete the cut with their overlapping peripheral portions below the trough conveyor, the jacks 49 and 55 can be extended to swing arms 47 and 53 downward and outward to spread the saws 21 and 22 apart a distance at least substantially as great as the width of the trough conveyor. The conveying mechanism 19 may then be energized immediately to move the log bundle in the trough conveyor forward another increment equal to the length of the next batch of bolts to be cut while the carriage is being raised by contraction of jacks 33 and 35. When the saws have been moved upward to an elevation such that they can be swung inward without interfering with the log bundle, the jacks 49 and 55 can be contracted to swing the saws inward and upward again into the solid line positions shown in FIG. 6 preparatory to lowering the saw carriage again to cut off the next batch of bolts from the log bundle.

Figure 7:
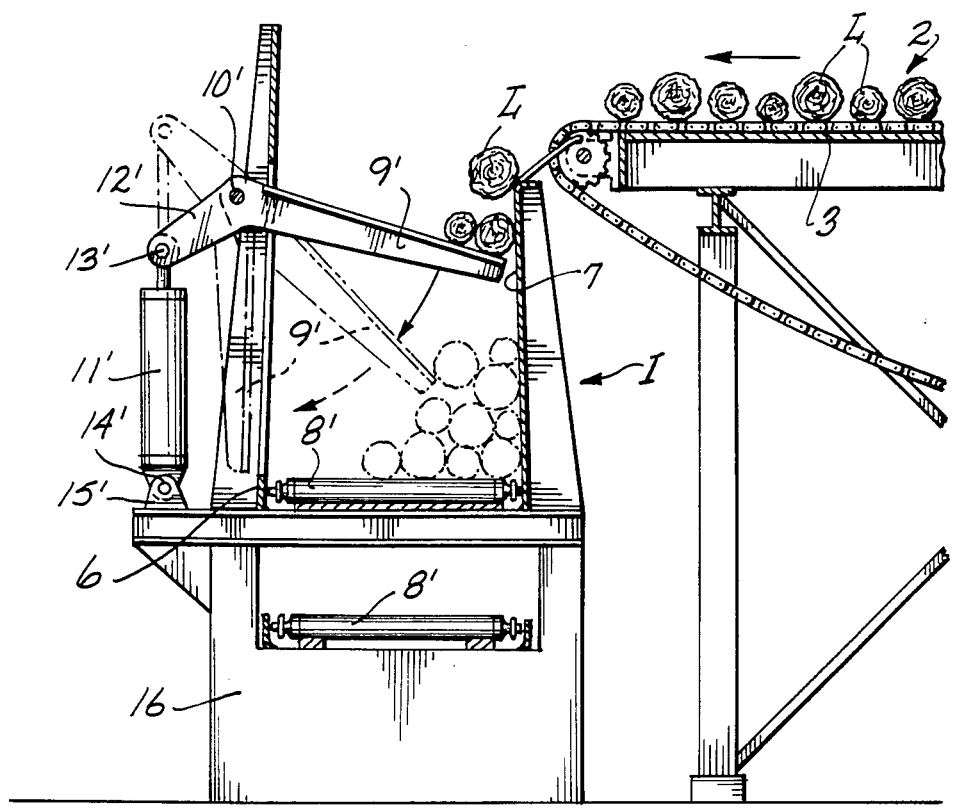
FIG. 7 is a transverse section of the apparatus near the feed end showing structure alternative to that shown in FIGS. 2 and 3.

FIG. 7 shows log-supporting and lowering mechanism of a type different from that shown in FIGS. 2 and 3. This mechanism can be used either with a live-roller type of conveyor in the bottom of the trough conveyor 1 or with a chain type or flight type of conveyor 8' shown in FIG. 7, because in this instance the log-receiving arms 9' are always located above the conveyor. As shown in FIG. 7, such arms are mounted on pivots 10' supported from wall 6 of the conveyor remote from the deck 2 and can swing about such pivots between the upper full line position shown in FIG. 7 and a lower position parallel to the wall 6.

In their upper positions, the arms 9' are inclined somewhat downwardly toward the wall 7 so that logs L deposited on them from the deck 2 will roll from them into the bottom corner of the trough conveyor closer to wall 7. Additional logs will then fill into the portion of the trough conveyor bottom farther from wall 7 as the arms 9' swing farther downward to their lower upright position. The logs will thus be distributed in a pile substantially evenly across the width of the conveyor.

The arms 9' are supported and controlled by actuators in the form of upright fluid pressure jacks 11', arranged alongside the trough conveyor wall 6 and having their upper ends connected to actuating projections 12' of the arms projecting outwardly from the pivots 10'. The end portion of such an actuating projection 12' is connected to the upper end of a jack 11 by pivot 13' and the lower end of such jack is connected by a pivot 14' to a bracket 15' mounted on the frame 16 of the trough conveyor. Swinging of the arms may be controlled by an operator operating the jacks 11', or such jacks can be of the pneumatic type or the actuators can be of the spring type to enable the weight of logs on the arms 9' to swing the arms downward progressively in response to the weight of the logs received by the arms compressing air in the jack cylinder or stressing the spring, at least until the arms have been swung downward into positions approaching the lowered upright positions. To swing the arms fully into their lowered upright positions, fluid under pressure could be supplied to the cylinders of the jacks. If desired, the arms 9, shown in FIGS. 2 and 3, could be operated in a similar manner by being capable of being lowered automatically in response to the weight of the logs deposited onto such arms.

I claim:

1. Cutoff mechanism for cutting bundled logs into bolts comprising a deep trough conveyor having a generally flat bottom and opposite upright sides with a rise at least approximately as great as the horizontal width of said conveyor for receiving a plurality of logs with their lengths generally in registration to form a log bundle in said trough conveyor composed of several superposed layers of logs, and log bundle cutoff means adjacent to and beyond the discharge end of said deep trough conveyor and including a frame having two guide columns spaced apart horizontally a distance greater than the width of said deep trough conveyor, support means guided for elevational movement by said guide columns, two circular cutoff saws mounted on said support means in side by side substantially coplanar relationship with adjacent portions of their peripheries in overlapping relationship substantially centrally over said trough conveyor, and actuating means for moving said support means downward relative to said frame to effect descent of said cutoff saws from an upper position in which the overlapping portions of said saws are higher than the logs in said trough conveyor, for cutting bolts as the support means descend first from the logs in the upper outer corners of the bundle of logs in said deep trough conveyor and then from logs inward and downward from such upper outer corners to enable outer bolts to fall away from the log bundle before inner bolts for freeing inner bolts from laterally outward restraint on being severed, to a lower position in which the overlapping portions of said cutoff saws are lower than the bottom of said trough conveyor for cutting bolts from the logs in the lowest layer of the log bundle in said deep trough conveyor from its outer edges toward its central portion.

2. The cutoff mechanism defined in claim 1, and a deck spaced lengthwise of the trough conveyor from the cutoff means and located alongside the trough conveyor for receiving logs, and conveyor means carried by said deck for moving logs therefrom into the trough conveyor.

3. The cutoff mechanism defined in claim 2, in which the spacing between the deck and the cutoff means is at least approximately as great as the length of logs to be bundled in the trough conveyor.

4. The cutoff mechanism defined in claim 3, in which the opposite sides of the trough conveyor converge upwardly to prevent logs in the trough conveyor from exerting downward thrust force on the sides of the conveyor.

5. Cutoff rechanism for cutting bundled logs into bolts comprising a deep trough conveyor for receiving a plurality of logs with their lengths generally in registration to form a log bundle in said trough conveyor, said trough conveyor having conveying means in its lower portion, log-supporting means above said conveying means for supporting above said conveying means logs deposited into said trough conveyor and for lowering said deposited logs onto said trough conveyor including pivoted arms having portions projecting lengthwise into said trough conveyor transversely thereof and swingable between substantially horizontal positions for receiving logs and lowered positions for lowering logs supported thereby onto said conveying means in said trough conveyor, and log bundle cutoff means adjacent to and beyond the discharge end of said trough conveyor and including a frame having two horizontally spaced guide columns, a carriage having a crosshead and two generally parallel legs depending from said crosshead and guided for elevational movement by said guide columns, respectively, two circular cutoff saws mounted, respectively, on said legs of said carriage with adjacent portions of their peripheries in overlapping relationship, and actuating means for moving said carriage elevationally relative to said frame for movement of said cutoff saws between an upper position in which the overlapping portions of said saws are higher than the logs in said trough conveyor and a lower position in which the overlapping portions of said saws are lower than the bottom of said trough conveyor.

6. The cutoff mechanism defined in claim 17, in which the conveying means are live rolls and the log-supporting arms are located for swinging downward between adjacent live rolls.

7. Cutoff mechanism for cutting logs into bolts comprising a deep trough conveyor for receiving a plurality of logs with their lengths generally in registration to form a log bundle in said trough conveyor, and log bundle cutoff means adjacent to and beyond the discharge end of said deep trough conveyor and including a frame having two guide columns spaced apart horizontally a distance greater than the width of said deep trough conveyor, a carriage having a crosshead and two generally parallel legs depending from said crosshead and guided for elevational movement by said guide columns, respectively, two circular cutoff saws mounted, respectively, on said legs of said carriage with adjacent portions of their peripheries in overlapping relationship, two arms swingably mounted on said carriage legs, respectively, each of said arms carrying one of said circular cutoff saws, actuating means for moving said carriage elevationally relative to said frame for movement of said cutoff saws between an upper position in which the overlapping portions of said saws are higher than the logs in said deep trough conveyor and a lower position in which the overlapping portions of said saws are lower than the bottom of said deep trough conveyor, and means for swinging said arms relative to said carriage legs for retracting said saws carried thereby away from each other to be spaced apart a distance at least substantially as great as the width of said deep trough conveyor for enabling said carriage to be raised for moving said saws from their lower position to their upper position while being held out of registration with the trough of said deep trough conveyor.

8. A process for cutting bundled logs into bolts which comprises confining the logs in a generally rectangular bundle having a rise at least approximately as great as its width and composed of several superposed layers of logs, lowering through the log bundle two circular cutoff saws arranged in side-by-side substantially coplanar relationship with adjacent portions of their peripheries in overlapping relationship substantially centrally over the log bundle, and moving the saws downward conjointly from a position higher than the log bundle and thereby cutting bolts as the saws descend first from the logs in the upper outer corners of the bundle of logs and then from logs inward and downward from such upper outer corners to enable outer bolts to fall away from the log bundle before inner bolts, thereby freeing inner bolts from laterally outward restraint on being severed, and continuing to lower the saws conjointly to a lower position in which the overlapping portions of the saws are lower than the bottom of the log bundle for cutting bolts from the logs in the lower layer of the log bundle from its outer edges toward its central portion.

* * * * *

UNITED STATES PATENT AND TRADEMARK OFFICE
CERTIFICATE OF CORRECTION

PATENT NO. : 4,679,475
DATED : July 14, 1987
INVENTOR(S) : Luis F. Antezana

It is certified that error appears in the above—identified patent and that said Letters Patent are hereby corrected as shown below:

Claim 5: column 7, line 66, after "conveyor" change the period to a comma.

Claim 6: column 8, line 14, cancel "17" and insert ...5...

Signed and Sealed this

Twenty-fourth Day of November, 1987

Attest:

DONALD J. QUIGG

*Attesting Officer*     *Commissioner of Patents and Trademarks*